No. 888,752.
PATENTED MAY 26, 1908.
H. W. SAYLES.
REGISTER.
APPLICATION FILED MAY 7, 1906.
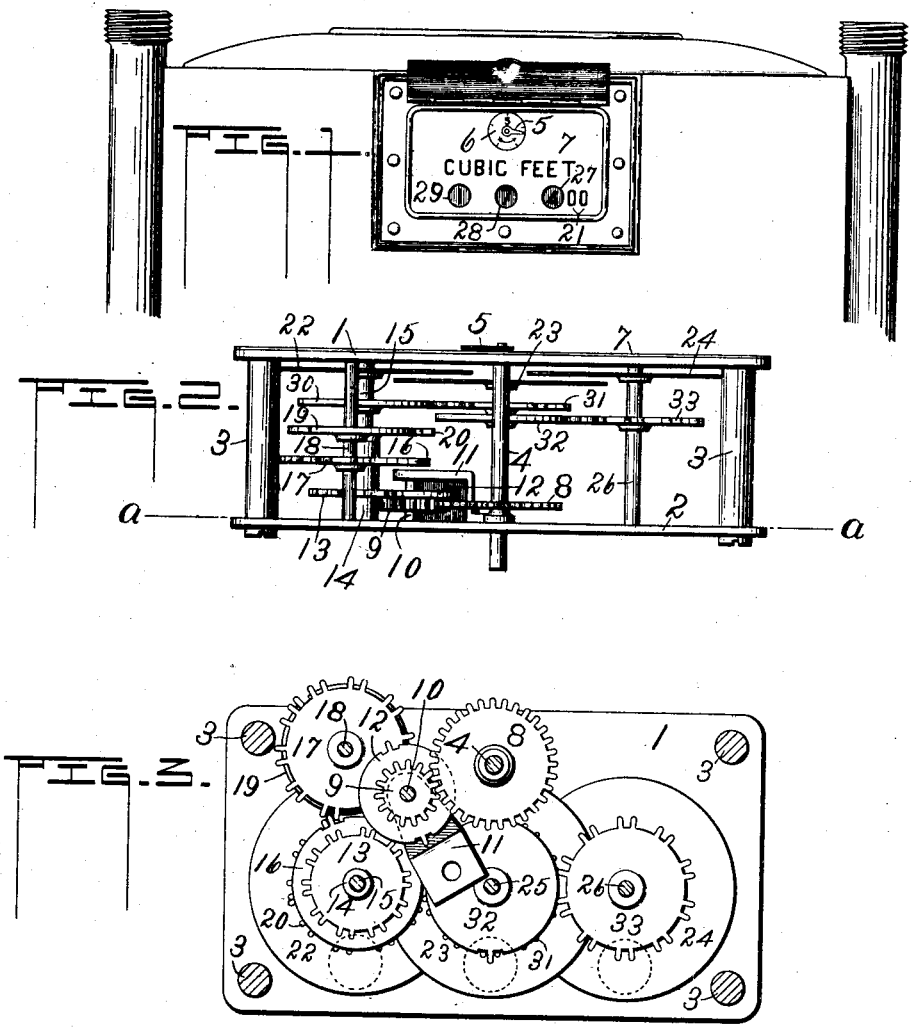
Witnesses:-
E. W. Giles
Mary E. Conneyys.
Inventor.
Henry W. Sayles
By Wm. V. Tefft Atty.

UNITED STATES PATENT OFFICE.

HENRY W. SAYLES, OF PEORIA, ILLINOIS.

REGISTER.

No. 888,752.     Specification of Letters Patent.     Patented May 26, 1908.

Application filed May 7, 1906. Serial No. 315,506.

*To all whom it may concern:*

Be it known that I, HENRY W. SAYLES, a citizen of the United States, residing at Peoria, in the county of Peoria and State of Illinois, have invented certain new and useful Improvements in Registers; and I do hereby declare that the following is a full, clear, and exact description of the invention, which will enable others skilled in the art to which it appertains to make and use the same.

This invention has reference to recording devices for meters, particularly to that class known as "straight reading" registers, in which the figures which indicate the measurement of the fluid, appear in a straight line through sight openings or windows in the face plate of the register.

In straight reading registers, it is necessary that the figures advance in an intermittent or step by step movement and that the time consumed in changing or advancing the figures be reduced to a minimum so that the figures will be kept in view at all times.
Heretofore and in registers of this class now commonly in use, this instantaneous step by step movement is accomplished by gradually accumulating energy by means of a spring or weight during the passage of the volume of fluid represented by the next change in figures through the meter and releasing and utilizing said accumulated energy at the instant the said volume of fluid has passed through the meter to advance the figures to indicate the passage of that volume.

In my invention, I provide a register of simple construction and operated with a positive motion in which the same result is obtained without the use of springs or weights and in which the different parts are constantly interlocked and prevented from movement except at the proper time.

My invention also embraces other features of improvement which will more fully appear hereinafter.

In the accompanying drawings, which illustrate a register embodying my improvements, Figure 1 is a front view of the upper portion of a meter showing my register as it appears in operation; Fig. 2 a top or plan view of my improved register; and Fig. 3 a vertical longitudinal sectional view on the line *a—a* of Fig. 2, looking toward the front of the register.

The front and rear plates 1 and 2 respectively are spaced a suitable distance apart and held together by means of the posts or pillars 3, and support the operative parts of the register. The shaft or spindle 4, which is connected to and driven by the operating diaphgram of the meter in the usual manner, has a test hand 5 fixed on the front end thereof, which turns around a dial 6 on the face plate 7, which is secured to the front plate of the register, and each revolution of the said test hand indicates the passage of a small quantity of fluid through the meter, which, in the register herein shown and described, is five cubic feet. The shaft or spindle 4 is further provided with a spur gear 8 intermediate of the front and rear plates 1 and 2 respectively of the register, which meshes with the spur gear 9 on the short shaft or axle 10,—said shaft or axle being shortened and journaled at one end in the rear plate 2 and at the other end in the bracket 11 on the rear plate 2 to allow compact grouping of the gearing which operates the adding disks of the register.

For the purpose of securing such a speed that the adding disks will be operated or advanced instantaneously and at proper intervals, the gears 8 and 9 are of such relative size that the shaft or axle 10 will make two and one half revolutions to every revolution of the spindle 4, and there is fixed on the axle 10 a two toothed disk or wheel 12, which operates a ten space Geneva wheel 13, the two teeth on the disk 12 being arranged diametrically so that the Geneva wheel 13 is advanced one space in every one half revolution of the disk or wheel 12.

To secure compact grouping of the gearing of the register, the Geneva wheel 13 is mounted on a sleeve 14 which is loosely mounted to rotate on a portion of the disk shaft 15, and the said sleeve has a single toothed disk or wheel 16 thereon which operates a ten space Geneva wheel 17 fixed on the shaft or spindle 18 which is journaled in the plates 1 and 2 of the register frame, and has a single toothed disk or wheel 19 which operates a ten space Geneva wheel 20 on the disk shaft 15 of the hundreds disk of the register, the Geneva wheel 20 being arranged on the said disk shaft adjacent the sleeve 14 thereon to hold said sleeve in place. This register may be constructed to record any number of digits, but for ordinary purposes is not made to register higher than five digits or tens of thousands and it is customary as in the register herein shown, not to indicate changes or add less than one hundred feet, the number indicated by the register being read with the two ciphers 21.

The register herein shown is adapted to register tens of thousands and is provided with the disks 22, 23 and 24 respectively which carry numbers to indicate the hundreds, thousands, and ten thousands of cubic feet respectively and are arranged on their respective shafts 15, 25 and 26 so that the numerals thereof appear through the sight openings or windows 27, 28 and 29 respectively (shown at dotted lines in Fig. 3) in the front and face plate of the register. For operating the disks successively as required, there is provided on the shaft 15 a single toothed disk or wheel 30 which operates a ten space Geneva wheel 31 on the shaft 25 of the thousands disk and said shaft 25 of the thousands disk is provided with a single toothed wheel or disk 32 which operates a ten space Geneva wheel 33 on the shaft of the ten thousands disk, which arrangement requires one revolution of the shaft 15 which carries the hundreds disk to advance the disk 23 the distance of one figure, and requires one revolution of the shaft 25 which carries the thousands disk to advance the disk 24 the distance of one figure.

From the foregoing, it is apparent that the disk 22 advances one step for the passage of every hundred cubic feet of fluid through the meter and the passage of this amount of fluid operates on the mechanism of the register to produce this advance as follows:—One hundred cubic feet of fluid passing through the meter will cause the shaft 4 and gear 8 thereon to make twenty revolutions, and the gear 8 operating on the gear 9 will cause the shaft 10 and disk 12 thereon to make fifty revolutions during the passage of the hundred feet of fluid. As the disk 12, which has a continuous movement, performs the fifty revolutions, the two teeth thereon operate intermittently upon the ten space Geneva wheel 13 and cause the same to make ten revolutions, carrying the sleeve 14 and disk 16 thereon a similar number of revolutions and causing said single toothed disk 16 to operate upon the ten space Geneva wheel 17 and cause the same to make one revolution. The shaft 18 upon which the Geneva wheel 17 is mounted, is furnished with a single toothed disk 19 which operates upon the ten space Geneva wheel 20 of the disk shaft 15 and causes the disk 22 to move forward the distance of one space in every revolution thereof and register the hundred cubic feet of fluid passing through the meter.

It will be noted that the Geneva wheel 13 and consequently the sleeve 14 upon which it is mounted, operates in a clockwise direction, and as the shaft 15 operates in a corresponding direction, the operation of one will facilitate the operation of the other.

It will be further noted that inasmuch as the disk 12 and ten space Geneva wheel 13 are of approximately the same size, the Geneva wheel 13 will be advanced the distance of one space in one half of a revolution of the said disk 12, and consequently as the shaft 10 performs two and one half revolutions to every revolution of the shaft 4, the advance in figures will be effected by one twenty fifth of a revolution of the shaft or during the passage of one fifth of a cubic foot of fluid through the meter, thus reducing the time consumed in changing or advancing the figures to a minimum.

From the foregoing, it will be seen that I have provided a register that is straight reading, positive in action and constantly interlocked against accidental change of figures.

What I claim is:

1. A register comprising a driven shaft, a gear thereon, an axle having a gear thereon meshing with said driven shaft gear, a two toothed disk on said axle, a second shaft, a sleeve loosely mounted thereon, a Geneva wheel on said sleeve to engage said disk teeth, a single toothed wheel on said sleeve, a third shaft, a Geneva wheel on said third shaft to engage said single tooth of said wheel, a single toothed wheel on said third shaft, a disk shaft for the hundreds disk, a Geneva wheel on said disk shaft engaging said tooth of said wheel on the third shaft said last named Geneva wheel abutting the inner end of said sleeve and thereby restricting the longitudinal movement thereof on said disk shaft, second and third disk shafts, a single toothed wheel on said first disk shaft, a Geneva wheel on the second disk shaft engaging said wheel of the first disk shaft, a single toothed wheel on said second disk shaft, a Geneva wheel on the third disk shaft engaging said tooth of the wheel of the second disk.

2. A register embodying a front and back plate, three spaced disk shafts arranged in a line, and supported by said plates, a driven shaft, a second shaft adjacent the driven shaft, a gear on the driven shaft, a short axle having one end in said rear plate, a bracket supporting the other end of said axle, a gear on the axle between the plate and bracket meshing with said gear of the driven shaft, a two toothed disk on said axle to the rear of said gear thereon, a sleeve loosely mounted on one of said disk shafts, a Geneva wheel on said sleeve engaging said two toothed disk, means on said sleeve to operate said second shaft, a Geneva wheel on said disk shaft, abutting said sleeve and thereby preventing longitudinal movement thereof on said disk shaft, and means for operating the other two disk shafts from said first disk shaft.

In testimony whereof I have affixed my signature, in presence of two witnesses.

HENRY W. SAYLES.

Witnesses:
E. M. GILES,
MARY E. COMEGYS.